(12) United States Patent
East et al.

(10) Patent No.: US 8,736,558 B2
(45) Date of Patent: May 27, 2014

(54) TOUCH-SENSITIVE DEVICE

(75) Inventors: James East, Northants (GB); Chris Cowdery, Cambourne (GB); Martin Colloms, London (GB); Neil Harris, Cambridge (GB); Geoffrey A. Boyd, San Jose, CA (US); Timothy Christopher Johnson Whitwell, Hong Kong (HK)

(73) Assignee: New Transducers Limited, Cambourne, Cambridgeshire (GB)

( * ) Notice: Subject to any disclaimer, the term of this patent is extended or adjusted under 35 U.S.C. 154(b) by 914 days.

(21) Appl. No.: 12/747,366

(22) PCT Filed: Dec. 9, 2008

(86) PCT No.: PCT/GB2008/051167
§ 371 (c)(1),
(2), (4) Date: Aug. 13, 2010

(87) PCT Pub. No.: WO2009/074826
PCT Pub. Date: Jun. 18, 2009

(65) Prior Publication Data
US 2010/0302184 A1 Dec. 2, 2010

(51) Int. Cl.
*G06F 3/041* (2006.01)
(52) U.S. Cl.
USPC .......................................... 345/173; 345/178
(58) Field of Classification Search
CPC ............................... G06F 3/016; G06F 3/0433
USPC ...................... 345/156–184; 340/384.1, 540; 178/18.01–18.04, 20.01; 381/96, 122
See application file for complete search history.

(56) References Cited

U.S. PATENT DOCUMENTS

| | | | |
|---|---|---|---|
| 5,708,460 A * | 1/1998 | Young et al. | 345/173 |
| 5,977,867 A | 11/1999 | Blouin | |
| 6,864,877 B2 | 3/2005 | Braun et al. | |
| 2002/0075135 A1 | 6/2002 | Bown | |
| 2004/0233174 A1* | 11/2004 | Robrecht et al. | 345/173 |

(Continued)

FOREIGN PATENT DOCUMENTS

| | | |
|---|---|---|
| GB | 2385409 | 1/2005 |
| WO | 97/09842 | 3/1997 |

(Continued)

OTHER PUBLICATIONS

English Translation of "Text of the First Office Action" in counterpart Chinese Patent Application No. 200880126606.2, 3 pages. Dec. 9, 2008.

(Continued)

*Primary Examiner* — Prabodh M Dharia
(74) *Attorney, Agent, or Firm* — Gablegotwals (57) ABSTRACT

A user/machine interface comprising a panel having a surface, the panel being capable of supporting bending waves, a touch-sensitive input device associated with the surface, and means including a force transducer for providing force feedback to the input device. The force is in the form of pulses to the panel, the pulses being in the form of a modulated signal shaped as a damped sinusoid whereby a button click sensation is provided to the user's finger tip. The modulated signal may be produced by a narrow-band sine wave having a carrier frequency in the range 150 to 750 Hz and being of a duration of at least 10 ms.

19 Claims, 7 Drawing Sheets

(56) References Cited

U.S. PATENT DOCUMENTS

| | | | |
|---|---|---|---|
| 2005/0146511 A1* | 7/2005 | Hill et al. | 345/173 |
| 2006/0052143 A9 | 3/2006 | Tuovinen | |
| 2006/0146036 A1* | 7/2006 | Prados et al. | 345/173 |
| 2006/0152499 A1* | 7/2006 | Roberts | 345/173 |
| 2006/0279548 A1* | 12/2006 | Geaghan | 345/173 |
| 2007/0057781 A1* | 3/2007 | Breed | 340/457.1 |
| 2008/0007543 A1* | 1/2008 | D'souza | 345/177 |

FOREIGN PATENT DOCUMENTS

| | | |
|---|---|---|
| WO | 97/09843 | 3/1997 |
| WO | 97/09853 | 3/1997 |
| WO | 00/54548 | 9/2000 |
| WO | 01/31971 | 5/2001 |
| WO | 01/48684 | 7/2001 |
| WO | 01/54450 | 7/2001 |
| WO | 02/51201 | 6/2002 |
| WO | 03/054849 | 7/2003 |
| WO | 2008/045694 | 4/2008 |

OTHER PUBLICATIONS

ING. Hector Javier Sanchez Vargas, Office Action in counterpart Mexican Patent Application No. 2010/006478, Sep. 30, 2011, 3 pages, Instituto Mexicano de la Propiedad Industrial, Mexico.

Brown, L.M. and Brewster, S.A. and Purchase, H.C. (2006) Multi-dimensional tactons for non-visual information presentation in mobile devices. In, 8th conference on Human-Computer Interaction with Mobile Devices and Services, Sep. 12-15, 2006 ACM International Conference Proceeding Series vol. 159, pp. 231-238, Helsinki, Finland.

Poupyrev, Maruyama: Tactile Interfaces for Small Touch Screens, Proceedings of the 16th Annual ACM Symposium on User Interface Software and Technology, vol. 5, No. 2, 2003, pp. 217-220, Vancouver, Canada.

Scheibe: Modern Tactile Interaction, Lecture, Jul. 1, 2007, pp. 1-11, Ulm University, Germany.

Jones: Human Factors and Haptic Interfaces, Presentation, Jun. 14, 2001, Jun. 15, 2001, Massachusetts Institute of Technology, pp. 9, 23.

* cited by examiner

TOUCH-SENSITIVE DEVICE

TECHNICAL FIELD

This invention relates to a touch-sensitive device having the nature of a user/machine interface. More particularly, but not exclusively, the invention relates to apparatus which combines a vibro-acoustic device with a touch sensitive device.

BACKGROUND ART

Bending wave or distributed mode loudspeakers (DML) are described in International application WO97/09842 and other documents in the name New Transducers Ltd. Such loudspeakers may be used in applications where the loudspeaker element has additional functionality. For example, International applications WO97/09843, WO97/09853 and WO01/31971 describe the use of such panels as a ceiling tile, in a projection screen and in a keyboard, respectively.

Furthermore, applications of DML technology have extended to the use of both opaque and transparent loudspeaker panels incorporating touch-sensitive capability. For example International application WO00/54548 describes electronic apparatus incorporating a loudspeaker having a bending wave panel member with a user-accessible surface, an electro-acoustic vibration exciter on the panel member to introduce bending wave energy into the panel member in response to an electrical signal applied thereto, and at least one touch sensitive area on or associated with the said user-accessible surface and responsive to user contact. International application WO01/48684 describes a contact sensitive device comprising a transparent touch sensitive plate mounted in front of a display device.

International Application WO02/51201 describes apparatus comprising a bending wave panel loudspeaker having a bending wave panel defining a surface and an electro-acoustic transducer attached to the bending wave panel to excite bending waves in the panel to produce an acoustic output, an input device forming part of the surface and means for providing force feedback to the input device.

International Application WO01/54450 describes a transducer for producing a force which excites an acoustic radiator, e.g. a panel to produce an acoustic output. The transducer has an intended operative frequency range and comprises a resonant element which has a distribution of modes and which is modal in the operative frequency range. Parameters of the transducer may be adjusted to improve the modality of the resonant element. Such a force transducer is known as a distributed mode actuator or "DMA".

Touch panels with tactile feedback are known from U.S. Pat. No. 5,977,867 and WO 2008/045694.

It is an object of the present invention to provide an improved touch-sensitive device.

DISCLOSURE OF INVENTION

From one aspect, the present invention is a user/machine interface comprising a panel having a surface, the panel being capable of supporting bending waves, a touch-sensitive input device associated with the surface, means including a force transducer for providing force feedback to the input device, the force being in the form of pulses to the panel, the pulses being in the form of a modulated signal whereby a button click sensation is provided to the user's finger tip, where the modulated signal has a dominant carrier frequency in the range 150 to 750 Hz and being of a duration of at least 10 ms.

Preferably the carrier frequency will be close to 400 Hz. It has been found that a duration of longer than 40 ms does not improve the click sensation.

The modulated signal may be amplitude and/or frequency modulated. The modulated signal may be in the form of a damped sinusoid. The modulated signal may be in the form:

$$h(t) = \alpha t e^{1-\alpha t} \cos\left(\frac{\omega c t}{1 + \beta t}\right) \text{ or } h(t) = \alpha t e^{1-\alpha t} \sin\left(\frac{\omega c t}{1 + \beta t} + C\right)$$

where
α is a decay rate of the envelope
C is a constant
β is a parameter controlling the rate of frequency modulation, and
ωc is the angular frequency at time t=0.

The frequency modulation of the carrier may have a predetermined function defining modulation depth and content with time. The modulated signal fundamental (i.e. primary component) may comprise a narrow-band sine wave whereby it has a narrow frequency range as defined above and a short pulse duration.

From another aspect the invention is apparatus comprising a user/machine interface as described above, wherein the panel is the acoustic radiator of a bending wave panel loudspeaker, and wherein the transducer is a broad-band device that generates both acoustic output and force feedback.

The transducer may comprise a distributed mode actuator (as described in WO01/54450) and the first mode of the distributed mode actuator may be tuned to the modulated signal.

The modulated signal may be tuned to the whole body mode of the panel. Where the panel is small, e.g. for use in a smart 'phone or personal data assistant (PDA), it may have an aspect ratio of 3:2. The panel may have a shallow cavity enclosing its rear surface.

The panel stiffness and the output impedance of the actuator may be arranged to deliver a force to the user's finger tip of more than 30 mN. Preferably the force delivered to the finger tip is arranged to be in the range 30 to 500 mN.

Two or more distributed mode actuators may be attached to the panel and arranged to enhance the panel displacement at the touch location. Digital signal processing may be used to shape the modulated signal to enhance the panel displacement at the touch location.

The apparatus may thus combine loudspeaker and force feedback facility into the same surface. The panel may function as a ringer loudspeaker, and/or vibration transducer for mobile or cell 'phones, pagers etc. The force feedback facility is otherwise known as haptics.

The apparatus may comprise a visual display device associated with the bending wave panel. The visual display device may be in the form of a conventional display surface such as a liquid crystal display (LCD) panel. At least a part of the panel may be transparent and the visual display device may be mounted behind the transparent part of the panel and thus the panel may act as a transparent display window. Alternatively, the panel may also act as the display, for example by application of a light-emitting surface finish comprising light emitting polymers or pigments. Thus, the number of components in the device may be reduced without loss of versatility or functionality.

Other functions may be provided. The panel may function as a microphone. Alternatively, one or more microphones may be attached to the panel or the casing of the device. Any one of the following items may be attached to the panel or the casing, namely a stills or video camera, heating and/or cooling elements and a variety of other sensors, e.g. chemical composition, electrical sensors, light-meters etc.

Chromatic characteristics may be included in the panel, such as passive chromatic finishes, e.g. anti-glare or mirrored finishes. Alternatively or additionally, active chromatics may be provided, such as photo-chromatics or thermo-chromatics. The panel may have surface textures and/or variable surface contours.

A wide range of acoustic and other sensory functions may be simultaneously integrated into the panel. Thus the panel may be termed a hyper functional surface (HFS) since it is a single component assembly which may provide an increased number of functional synergies. The functions provided by the panel may be selected from any one of the functions mentioned above. For example, by using a transparent, touch-sensitive panel with force feedback facility, apparatus may be obtained which may be used to view information, hear acoustic signals (messages, bleeps, clicks etc) and feel simulated button clicks through one's fingertips.

One advantage of the apparatus may be that by using a touch sensitive panel the need for a separate keypad may be eliminated. This may be particularly useful in small electronic articles, for example hand-held devices, which have limited space for components. In certain applications (e.g. communications and computing), the size or bulk of devices and hence their internal volume in which individual components are housed is reducing and is tending towards zero. The usefulness of such devices may therefore be expressed in terms of their functionality per unit surface area. The invention anticipates this trend and offers a designer a way to maximise the range of sensory options for any given surface.

The apparatus according to the invention may reduce the surface area required to provide a plurality of functions. The invention may be considered to relate to the amalgamation of a vibro-acoustic device with other sensory features and functionality which results in significant benefits for the manufacture and use of such apparatuses which may be termed human machine interfaces (HMI).

Such multiple combinations would be more difficult using conventional loudspeakers. Mounting keypads, displays etc on the cone of a conventional loudspeaker is likely to interfere with the function of the cone.

BRIEF DESCRIPTION OF THE DRAWINGS

Embodiments of the invention will now be described, purely by way of example, with reference to the accompanying drawings.

FIG. 5b shows the relative power spectrum for the signal of FIG. 5a;

DETAILED DESCRIPTION OF THE DRAWINGS

Figure 1:
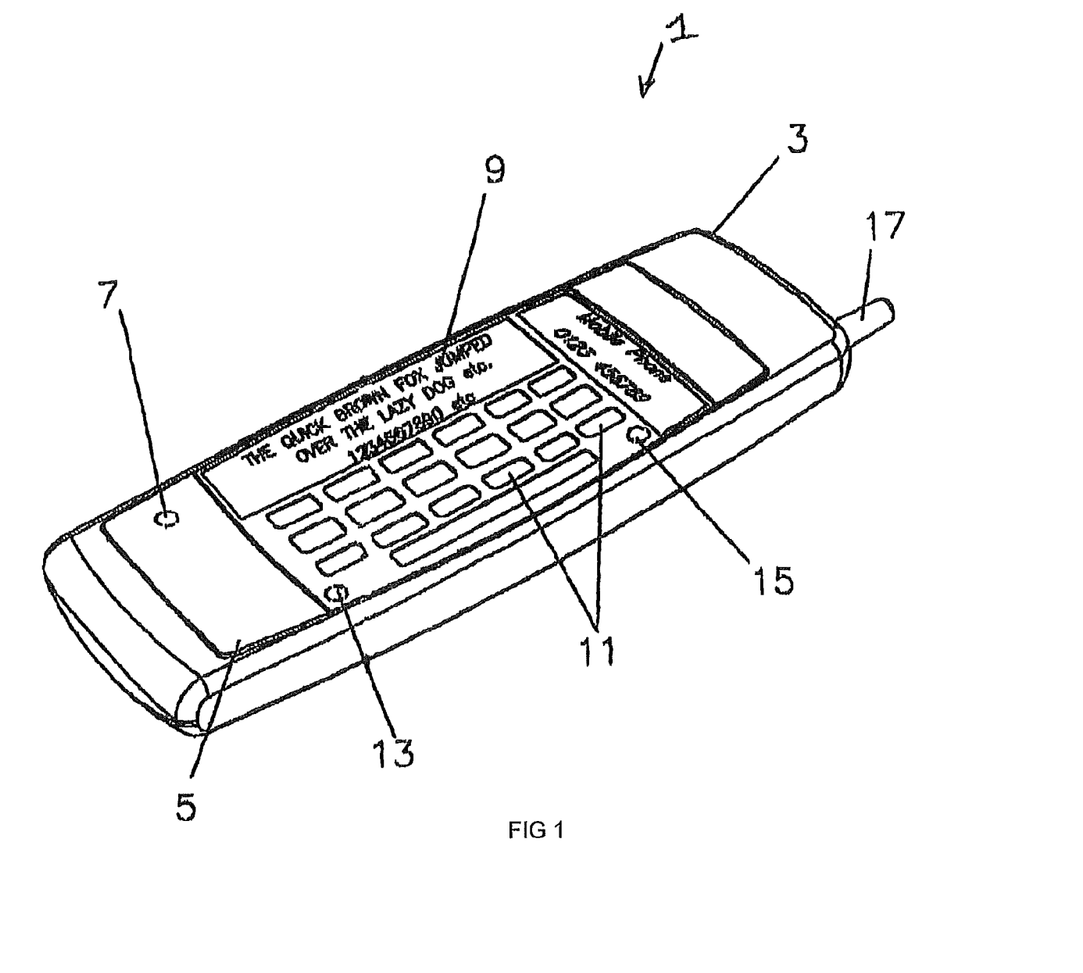
FIG. 1 shows a perspective view of a personal data assistant (PDA) according to the invention.

FIG. 1 shows apparatus according to the invention in the form of a smart-phone or personal data assistant (PDA) 1 having a casing 3 and a user/machine interface (an input device) in the form of a touch sensitive panel 5. The panel is of the appropriate thickness and moderate mechanical impedance to be set into bending wave vibration for several vibro-acoustic purposes. The panel is made from a transparent material allowing a liquid crystal display (LCD) 9 which is mounted behind the panel to be viewed.

The panel acts as the acoustic radiator of a loudspeaker and is capable of supporting bending waves. A first transducer 15 is mounted to the panel to excite bending wave vibration in the panel to produce an acoustic output. The volume of the acoustic output may be adjusted allowing the PDA to be used in conference mode as a hands-free loudspeaker telephone or in telephone mode to be held to a user's ear.

A second exciter 13 is also mounted on the panel to provide pulses to the panel when a key is depressed and hence provide haptics or tactile feedback. A single dual function broad band transducer may be provided which provides both the loudspeaker and feedback functionality. The dual function transducer, or either of the first or second transducers, may also be energisable in the body perceived band around 80 Hz to provide silent signalling of a call. Thus, the panel acts a multi-mode loudspeaker, for example, as a telephone earpiece, a hands-free speaker or a ringer.

The panel 5 also functions as a keypad or keyboard. Individual keys 11 of the keypad may appear on the display mounted underneath the panel or alternatively the keys may be marked on its surface. A microphone transducer 7 is also fixed to the panel whereby the panel may function as a microphone. Alternatively, one or more microphones may be attached to the panel or the casing allowing sound capture and localisation for sound reproduction when in conference or video mode.

A mobile communications aerial 17 and associated conventional mobile telephony circuitry (not shown) allows the device to function as a mobile telephone or to send and receive messages or video material. Images may be captured using an embedded video camera.

As outlined above the panel provides several functions and may be considered to be a hyper-functional surface (HFS). The apparatus has a simple construction and performs the function of many distinct devices each of which use the panel (as HFS) as a user's main interface medium.

Figure 2:
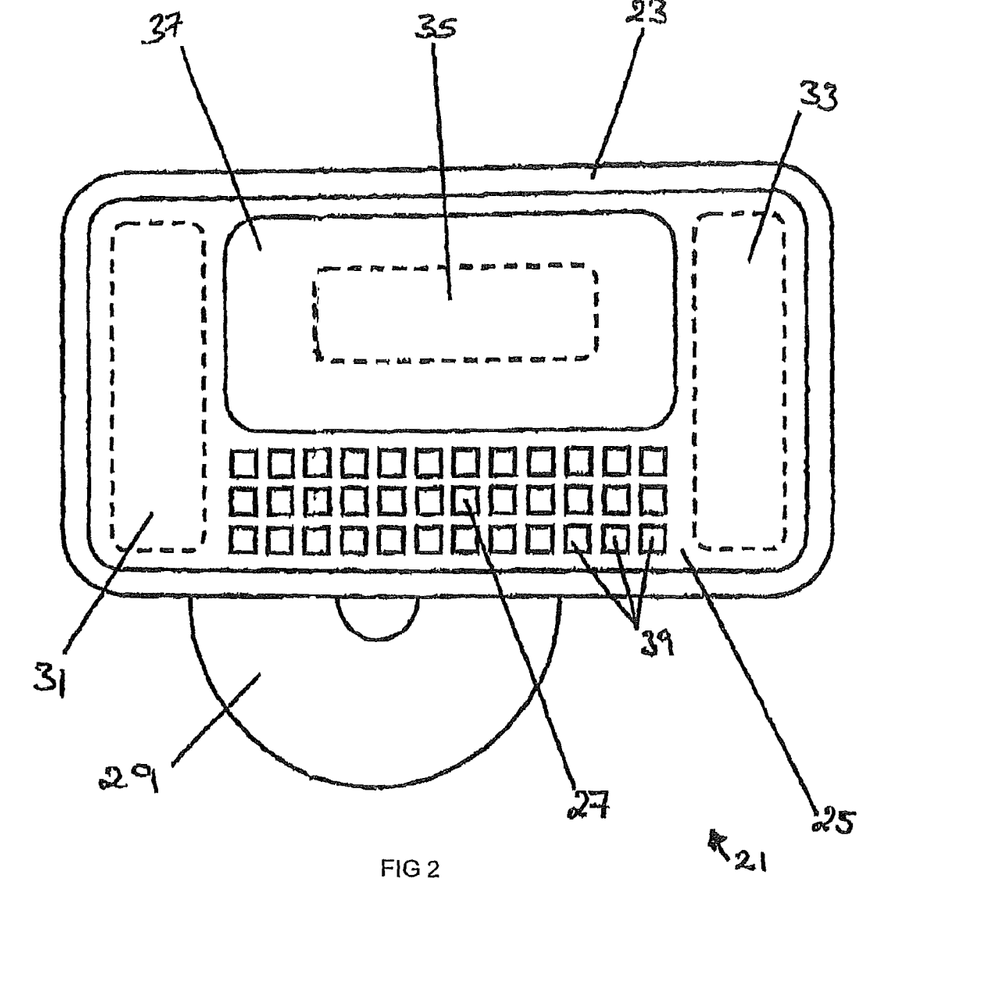
FIG. 2 shows a plan view of a handheld multi-channel player according to the invention.

FIG. 2 shows an alternative apparatus according to the invention in the form of a handheld multi-channel player 21 having a casing 23 and a panel 25. The panel 25 is divided into several regions each providing separate functions, for example loudspeaker, input and/or display functions.

The panel has three loudspeaker regions which provide left, right and centre channels 31, 33, 35 respectively. At least one transducer (not shown) is mounted to each panel region to excite bending wave vibration in the panel to produce an acoustic output. When a disc 29 is inserted into the player 21 as indicated, the panel 25 may reproduce multi-channel information stored on the disc.

A video display area 37 is mounted behind a transparent region of the panel 25. The display area 37 may display information from the disc 29 or alternatively may display information inputted to the device by a user on a keyboard region 27 of the panel 25. The keyboard region 27 which forms a user/machine interface includes several keys 39 marked on the surface of the panel 25. The keys 39 are configured to provide haptics or tactile feedback, for example by providing a transducer as described in FIG. 1.

Figure 3:
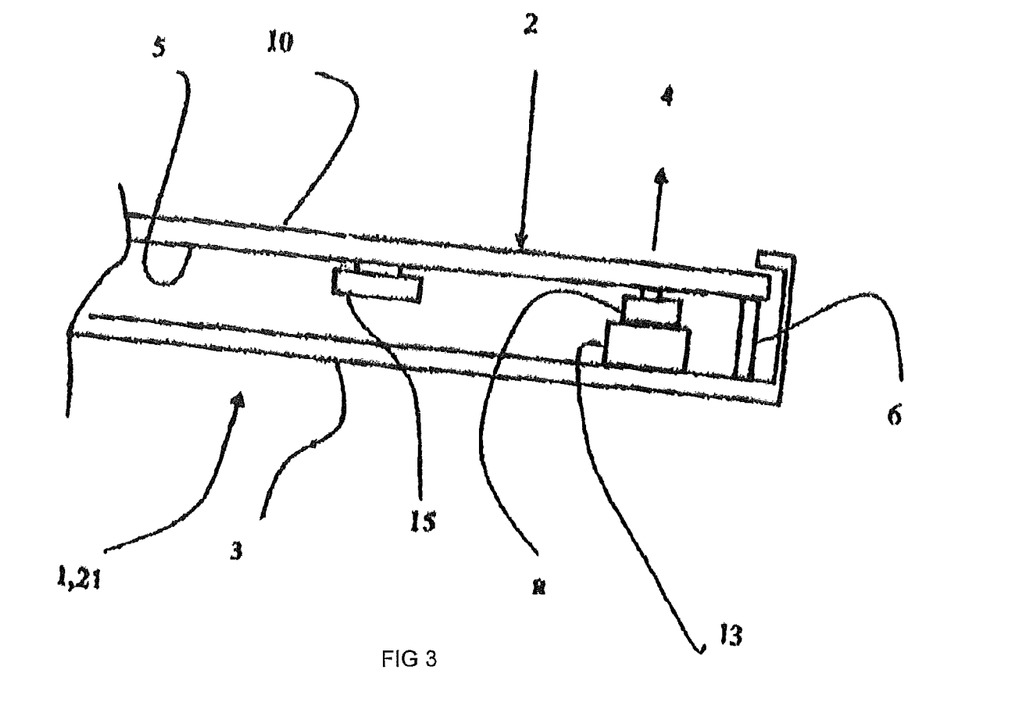
FIG. 3 is a sectional side view of the device of FIG. 1 or the device of FIG. 2.

FIG. 3 is a sectional side view of the PDA of FIG. 1 or the disc player of FIG. 2. In FIG. 3 it can be seen that the bending wave loudspeaker panel 5 is mounted in the casing or housing 3 of the device 1,21 via a peripheral compliant mounting 6. The transducer 15 is mounted to the rear or internal surface of the panel 5 and is of the inertial type. The transducer is arranged to apply bending wave energy to the panel 5 to produce an acoustic output. The transducer may be of the kind described in WO97/09842 or of the kind described in WO01/54450. The transducer 13 is a distributed mode actuator and is mounted to the casing or housing 3 of the device and is coupled to the panel 5 by means of a coupler 8 to apply force feedback to the panel. The transducer 13 applies a modulated or transient spike signal to the panel when it is touched on its surface 10 by a user's finger tip, as indicated by the arrow 2, and applies an opposing feedback force to the finger tip, as indicated by the arrow 4, to simulate a button or key click.

Figure 4:
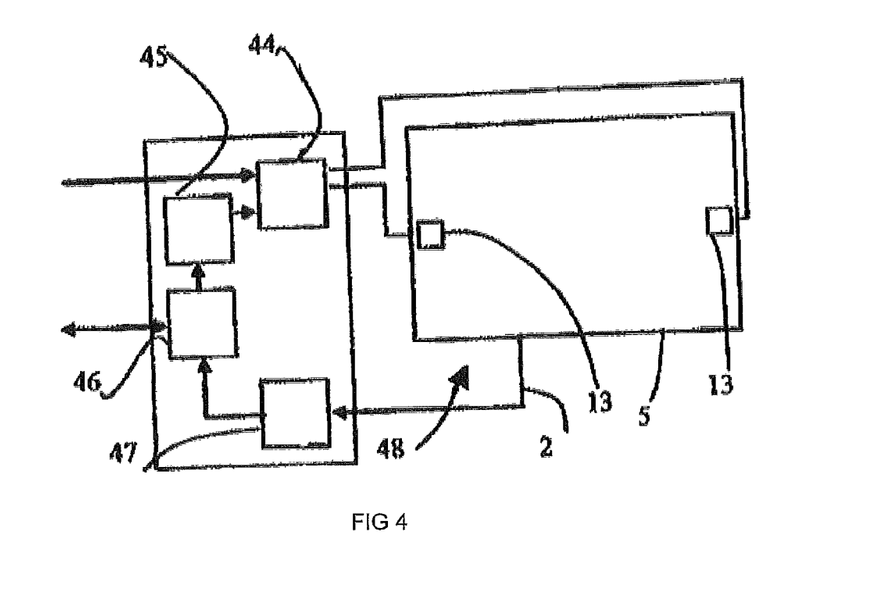
FIG. 4 is a block diagram of touch-sensor and haptic feedback circuitry.

The block diagram of FIG. 4 shows a circuit system 48 of the force feedback or haptic arrangement of the kind described above. The bending wave panel radiator 5 incorporates a touch sensitive surface 10 which outputs raw touch data 2. A pair of the force actuators 13 are coupled to the panel 5 to deliver haptic feedback to the user. The raw touch data is handled by an interface 47 and in suitable form feeds a haptic logic control unit 46. This may send information to a central processor (not shown) to provide visual and/or sound information concerning the touch data and its integrity. The central processor may also receive information, for example to modify the haptic response to the user, to provide further information.

A generator 45, which may include a store, provides synthesised signals which are shaped to provide appropriate vibratory input to an amplifier 44 which feeds the force transducers 13. Multiple amplifier outputs to multiple transducers 13 may be provided to define a more specific location of the haptic forces. The amplifier 44 may also be under the control of the central processor, for example to provide a graded haptic response. It will be understood that the system shown in FIG. 4 will require the usual power source(s), not shown.

Figure 5A:
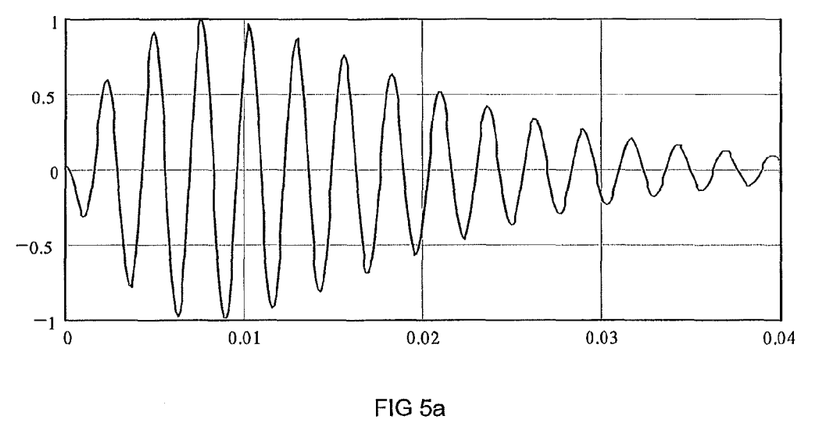
FIG. 5a shows the amplitude against time for an amplitude modulated signal.

The amplifier is arranged to output a transient spike signal or pulse to the transducer(s) 13. FIG. 5a shows such a signal which an amplitude modulated signal in the form of a damped sinusoid, that is an electromagnetic wave whose amplitude decreases with time. As is shown clearly, the amplitude of the signal peaks after 0.01 seconds and is significantly reduced by 0.04 seconds and may thus be termed a "bong".

The signal is creating using an envelope function (or amplitude modulating function) of the form $$g(t)=\alpha t\exp(1-\alpha t)$$

where $\alpha$ is a decay rate of the envelope.

The value of this function is zero at time zero and tends to zero at infinity. It has a maximum value of 1 at $t=1/\alpha$. An arbitrary pulse width may thus be determined by appropriate choice of $\alpha$ with the duration of the pulse being inversely proportional to $\alpha$.

This envelope function may be used to provide the composite signal which is a product of a sinusoidal signal and the envelope function to give:

$$f(t)=g(t)\sin(\omega ct)=\alpha t\exp(1-\alpha t)\sin(\omega ct)$$

where $\omega c$ is the angular frequency at time $t=0$.

This signal is thus a modulated sine wave and $\sin(\omega ct)$ may be expressed as $\sin(\Phi(t))$. The function may be simple, e.g. $\omega t+$constant or may be more complicated, i.e. to include frequency or phase modulation. A general form for $\phi(t)$ is $$\phi(t) = \frac{\omega ct}{1+\beta t} + C$$

where C is a constant
$\beta$ is a parameter controlling the rate of frequency modulation, and
$\omega c$ is the angular frequency at time $t=0$.

The various free variables, e.g. $\alpha$, $\beta$ and the constant C, are assigned values that result in a good match between the spectrum of the signal and the sensitivity data for the finger. For the simple case, the spectrum of f(t) may be calculated analytically, but in general a numerical Fourier transform will be needed. It is found that the very best signal sets the peak of the amplitude (or envelope) function to match a peak of the sinusoid. Thus for the simple expression $\phi(t)=\alpha ct$, a value of $\alpha=583$ is the optimum value and $\omega c$ is $628\pi$.

For $$\phi(t) = \frac{\omega ct}{1+\beta t},$$

a value of $\alpha=493$ is the optimum value, with $\beta=99.9$ and $\omega c=572\pi$.

Figure 5B:
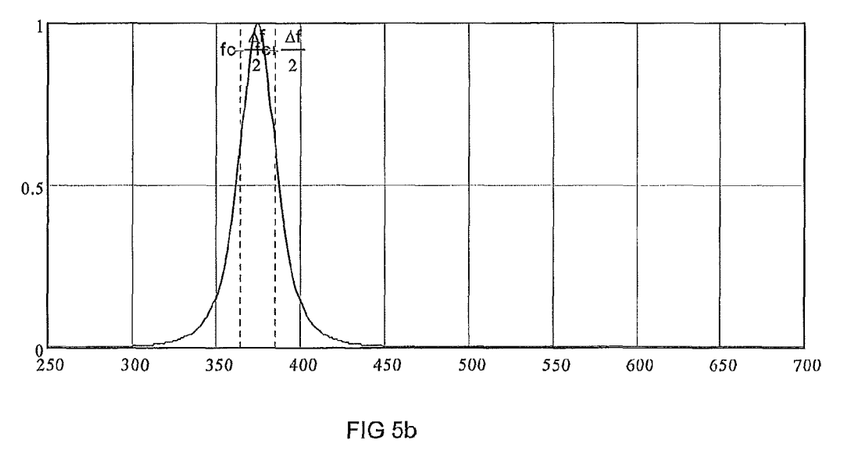

The length of the envelope should be greater than 10 ms, but increasing the length beyond about 40 ms does not improve the detectability. These durations correspond to values of $\alpha$ in the range 125 to 500. The signal is audible, so a "nice" sounding one is preferable. Smaller values of $\alpha$ result in fairly pure tone-like sounds, whereas the larger values result in click-like sounds. In the signal shown in FIG. 5a, the centre frequency is 375 Hz and $\alpha=125$. The power spectrum of this signal is shown in FIG. 5b, where it is seen that the bandwidth of this signal is about 1 semitone. It would be quite possible to play tunes with these signals.

Figure 5C:
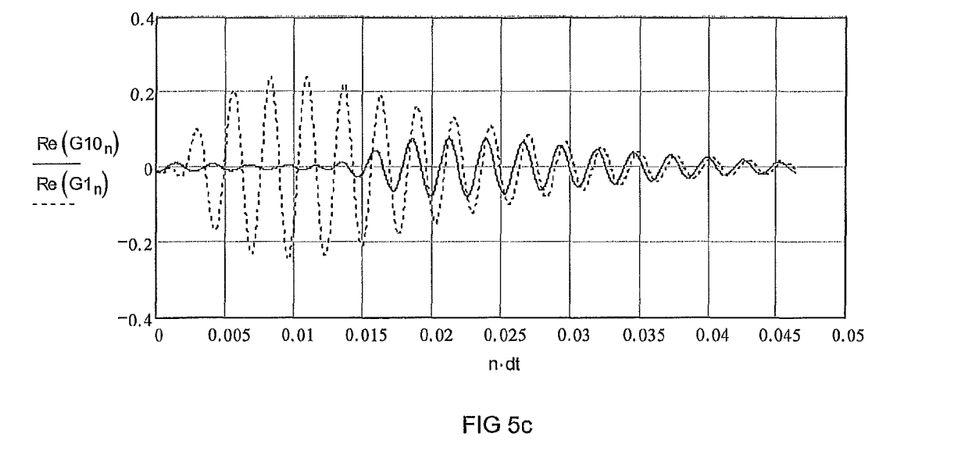
FIG. 5c shows the pulse shape for the signal of FIG. 5a at 0.1 m and 1 m from the point source on the panel.

Dispersion is an effect of certain materials which may cause the velocity of the waves in the signal to vary over the frequency range of the signal. As shown in FIG. 5c, dispersion is not an issue because the signals are so narrow-band. With the signal of FIG. 5a, no distortion in the envelope is apparent after 1 m of travel along a coated plastic panel typical of telecoms use. For the shorter pulses, some distortion may be seen, but as this is substantially larger than anything but a plasma TV, the effect is considered of no importance. It is worth noting that at 400 Hz, the wavelength in the panel is about 100 mm, making any localisation of the haptic feedback irrelevant for all but the largest displays.

Figure 5D:
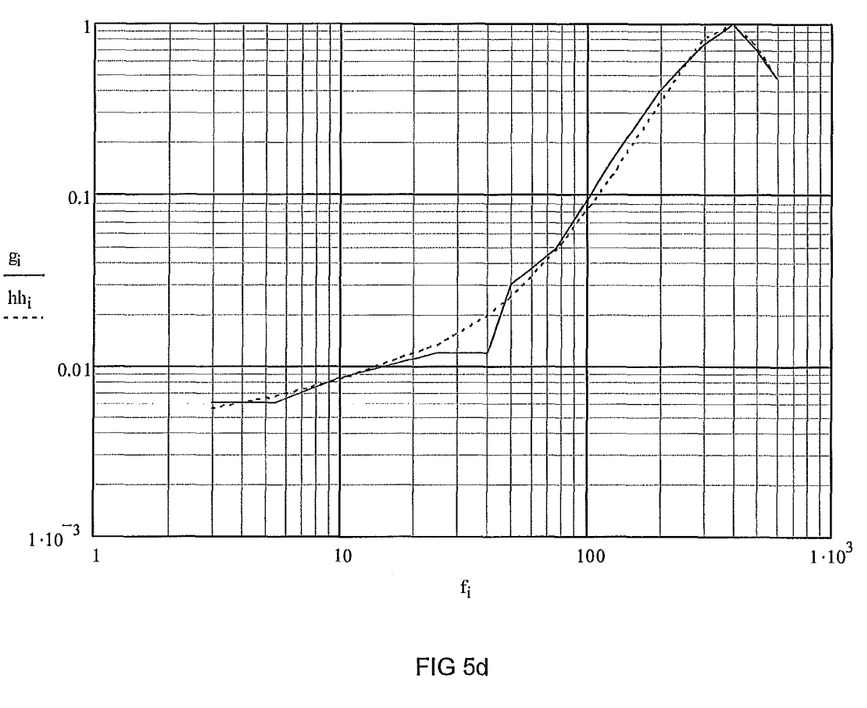
FIG. 5d shows the absolute threshold (mm) against frequency (hz) to compares the relative sensitivity data for a human finger against its estimated transfer function.

The frequency is determined from the displacement sensitive of a human finger. A PDF document entitled "Human Factors and Haptics Interfaces" by Lynette Jones of the Department of Mechanical Engineering, Massachusetts Institute of Technology shows a "tactile tuning curve". This depicts the frequency dependent thresholds of sensitivity to displacement. The data depicted in this PDF document is compared in FIG. 5d with a full (minimum-phase) transfer function which is described by the following equation:

$$H(s) = \left(\frac{s+80\pi}{s}\right)^2 \left(\frac{s+10\pi}{s+20\pi}\right)\left(\frac{2\alpha s}{\omega c^2 + 2\alpha s + s^2}\right)^2,$$

$$\omega c = 2366,$$

$$\alpha = 1107$$

From FIG. 5d, it is clear that the frequency of the carrier should be between, say, 250 Hz and 700 Hz, with frequencies close to 400 Hz being particularly effective. Interestingly, this function H(s) is reminiscent of the Laplace transform F(s) of the function ƒ(t) used earlier, i.e.

$$F(s) = \frac{2\alpha\omega ce\,(s+\alpha)}{(\omega c^2 + 2\alpha s + s^2)^2}$$

The impedance presented by the finger is essentially that of a spring with a stiffness of about 22 kN/m for all frequencies up to about 3 kHz, after which the damping becomes increasingly important. As a consequence, the sensitivity of the finger to force may be assumed to scale directly from its sensitivity to displacement. At around 300 Hz, the force sensitivity threshold calculates to about 30 mN. Accordingly, the panel stiffness and the output impedance of the actuator are arranged to deliver a force to the user's finger tip of more than 30 mN, preferably 300 mN to 500 mN.

An alternative damped sinusoidal signal is a frequency and amplitude modulated cosine function, i.e.

$$h(t) = \alpha t e^{1-\alpha t}\cos\left(\frac{\omega c t}{1+\beta t}\right)$$

h(t) is the product of g(t)—the envelope function used above and fm(t)—a frequency modulating function.

β is a parameter controlling the rate of frequency modulation, and

ωc is the angular frequency at time t=0.

As before, the various free variables, e.g. α, β, are assigned values that result in a good match between the spectrum of the signal and the sensitivity data for the finger. The function may be further changed by adding a new variable A was added to the function.

$$h(t) = \alpha t e^{1-\alpha t}\cos\left(\frac{\omega c t}{1+\beta t} - A\right)$$

This amended function may then be optimally fitted to the target haptic spectrum. It was observed that for the best signals, the peak of the envelope at t=1/α corresponds with a peak in the cosine function. In this case, we can set A directly. Using elementary calculus confirms that the correct value sets the argument of the cosine to 0 at t=1/α, thus:

$$h(t) = \alpha t e^{1-\alpha t}\cos\left(\frac{\omega c t}{1+\beta t} - \frac{\omega c}{\alpha+\beta}\right)$$

as before h(t) is the product of g(t)—the envelope function and fm(t)—a frequency modulating function but in this case $$fm(t) = \cos\left(\frac{\omega c t}{1+\beta t} - \frac{\omega c}{\alpha+\beta}\right).$$

The optimal values for the three variables—α=532.5, β=83.85, ωc=3133 are slightly different from those of the original function. In both cases, the parameters are chosen to match a spectral template which shows the relative sensitivity of the finger-tips to vibration as a function of the vibration frequency. The aim is to put the most energy in the frequency range at which the fingers are most sensitive.

Figure 6A:
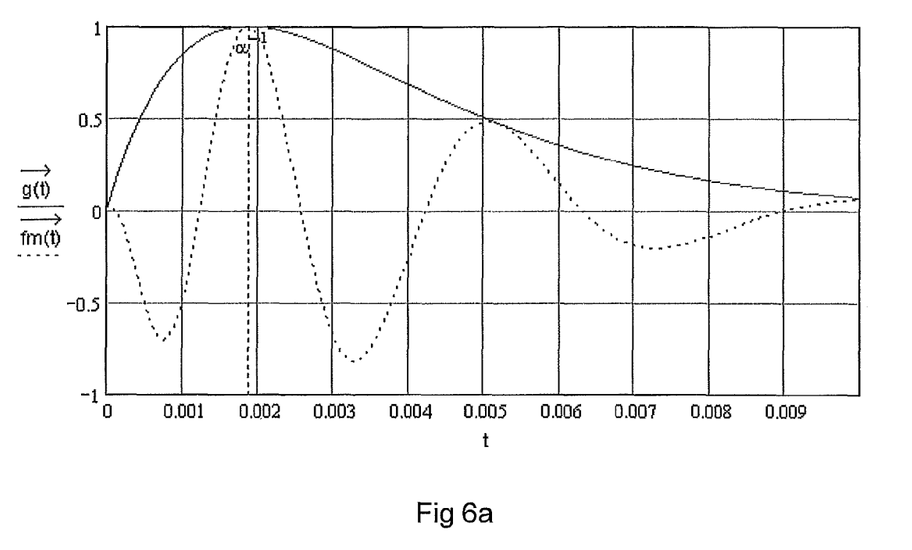
FIG. 6a plots the amplitude against time for the components of a frequency and amplitude modulated sinusoidal signal.
Figure 6B:
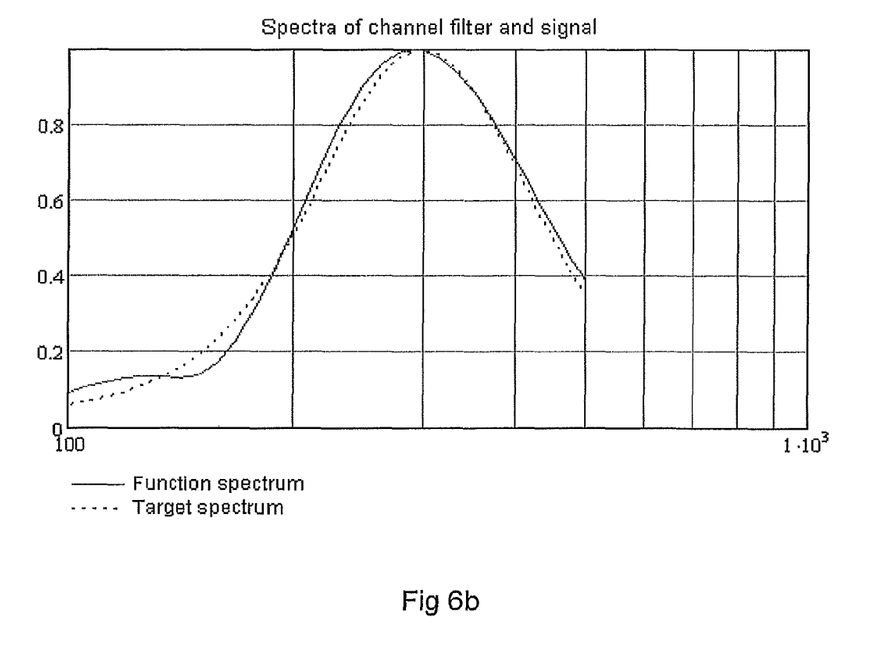
FIG. 6b plots the spectrum of the signal of FIG. 6a and the target spectrum.

FIG. 6a shows the variation in time for the envelope function g(t) (amplitude modulation function) and the frequency modulation function fm(t) of the signal. FIG. 6a also shows how α is derived. The timing of the first non-zero point of intersection is equivalent to 1/α. FIG. 6b shows the target spectrum (dotted line) which gives the desired sensation to a user and the actual spectrum of the modified function detailed above. There is a good match between the two spectra. Other values of the parameters, or even other signals, may be used to achieve similar aims. The signal of FIGS. 7a and 7b is just such a signal—its parameter values are also chosen to match a target spectrum.

Figure 7A:
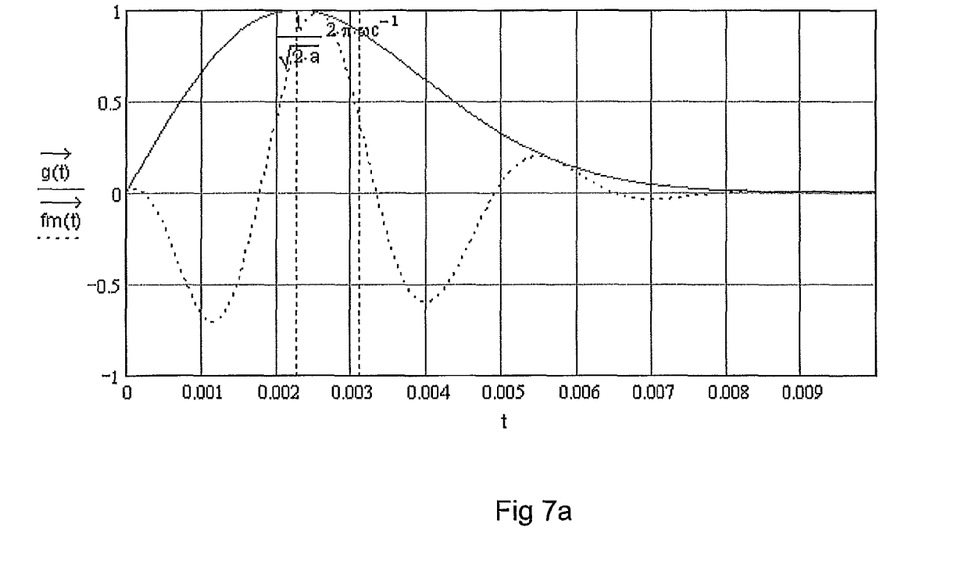
FIG. 7a plots amplitude against time for the components of an alternative modulated damped sinusoidal signal, and FIG. 7b plots the spectrum of the signal of FIG. 7a and the target spectrum.
Figure 7B:
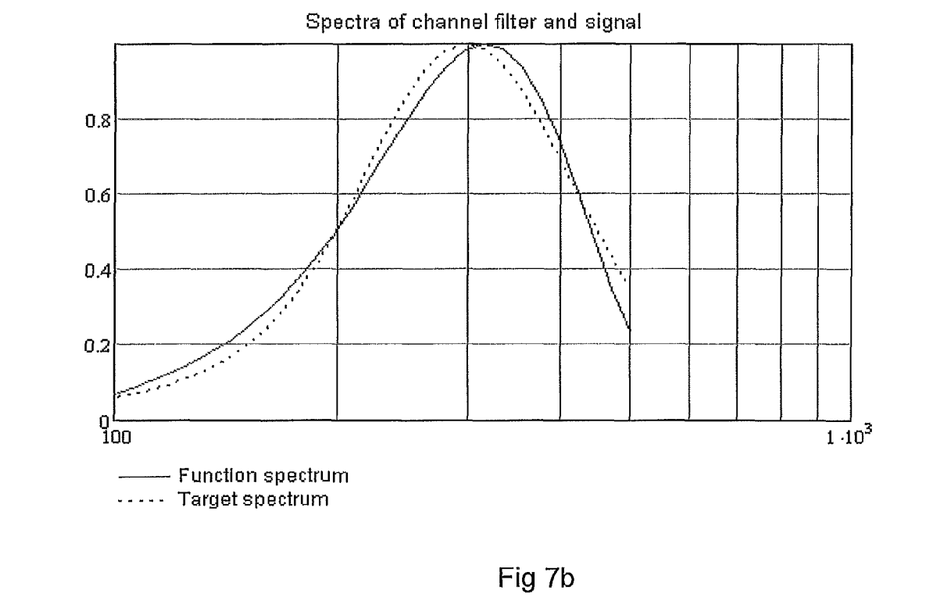

FIGS. 7a and 7b illustrate an alternative modulated sinusoidal signal having its basis starting in the frequency domain and expressed as.

$$h(t)=\sqrt{2a}t\exp(0.5-at^2)\cos(\omega ct-A)$$

Where a=96505=310.7², b=2011, A=5.181 rad=297°.

FIG. 7a shows that the sensitivity curve (fm(t)) resembles a normal distribution curve. It is also known that this curve (fm(t)) is its own Fourier transform, so the time domain signal should be similar. FIG. 7a also shows how a and ωc are calculated. a and ωc are calculated as described above. As shown in FIG. 7b, this alternative does not provide as good a fit to the target spectrum as the signal of FIG. 6a but has the main advantage that the high-frequency end of its spectrum falls faster.

Comparing the two signals, for the same peak amplitude, the alternative signal appears to be 25% more energy efficient. However, some testing has shown that 15%-20% higher amplitude is needed to get the same sensation, thereby eliminating the advantage. There is less high-frequency energy in the alternative signal, which may well help with making it more silent. In short, there is not much to choose between them.

It is important to note that any signal within the parameters of bandwidth and duration stipulated above is a possible candidate. The specific examples of modulated sinusoidal functions expressed above are not the only suitable signals. Any damped sinusoidal function (including sine, cosine waves or similar functions) with the appropriate modulation (amplitude, frequency or phase) may be used.

It will be appreciated that the apparatus shown may be adapted to function as a computer, communicator, web TV, videophone, camcorder, Dictaphone, organiser, augmented reality window, GPS/navigator, game and/or wearable fashion accessory. The apparatus may further comprise viewing apparatus for 3-D image perception or additional sound sources for reproducing extra audio channels, e.g. rear channels and a sub-woofer. While the media player of FIG. 2 has the example of disc stored audio and visual information, it will be appreciated that the storage means may also be solid state, memory chips, So the information may be downloaded, for example from a wireless link or from a computer.

The invention may be considered to unlock a large number of new device options which may be expressed as the total number of combinations of each of the separate sensory functions in conjunction with any or all of the other functions. By adapting the combination of functions, the invention may have application in each of the following fields:— a) control surfaces in all consumer/industrial applications (including displays or product housings),
b) telephones, including mobile or fixed telephones, intercoms, pagers, or videophones,
c) multimedia devices, including laptops or personal data assistants (PDAs),
d) electronic goods, including portable music or video players and recorders, Dictaphones, toys, games, cameras, video cameras, televisions, 3D televisions, virtual reality devices, augmented reality devices or video-on demand devices
e) other goods, e.g. white or brown goods, medical devices, clothing, badges, labelling, novelty and greetings products, credit cards or smart cards
f) in architectural applications, e.g. furniture or office equipment
g) in other applications, e.g. art or defence.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A user/machine interface comprising a panel having a surface, the panel being capable of supporting bending waves, a touch-sensitive input device associated with the surface having a touch location, a force transducer for providing force feedback to the input device, the force being in the form of pulses to the panel, the pulses being in the form of a modulated signal whereby a button click sensation is provided to the user's finger tip, where the modulated signal has a dominant carrier frequency in the range 150 to 750 Hz and being of a duration of at least 10 ms, and a digital signal processor to shape the modulated signal to enhance the panel displacement at the touch location.

2. A user/machine interface according to claim 1, wherein the carrier frequency is at or close to 400 Hz.

3. A user/machine interface according to claim 1 or claim 2, wherein the pulse duration is no more than 40 ms.

4. A user/machine interface according to claim 1, wherein the modulated signal is amplitude modulated.

5. A user/machine interface according to claim 4, wherein the amplitude modulated signal is in the form of a damped sinusoid.

6. A machine/user interface according to claim 1, wherein the modulated signal is frequency modulated.

7. A machine/user interface according to claim 6, where the frequency modulation of the carrier has a predetermined function defining modulation depth and content with time.

8. A machine/user interface according to claim 1, wherein the modulated signal fundamental comprises a narrow-band sine wave.

9. Apparatus comprising a user/machine interface as claimed in claim 1, wherein the panel is the acoustic radiator of a bending wave panel loudspeaker, and wherein the transducer is a broad-band device that generates both acoustic output and force feedback.

10. Apparatus according to claim 9, wherein the transducer comprises a distributed mode actuator and wherein the first mode of the distributed mode actuator is tuned to the modulated signal.

11. Apparatus according to claim 9 or claim 10, wherein the modulated signal is tuned to the whole body mode of the panel.

12. Apparatus according to claim 9, wherein the panel is small and has an aspect ratio of substantially 3:2.

13. Apparatus according to claim 9, wherein the panel stiffness and the output impedance of the actuator are arranged to deliver a force to the user's finger tip of more than 30 mN.

14. Apparatus according to claim 13, wherein the force delivered to the finger tip is arranged to be in the range 30 to 500 mN.

15. Apparatus according to claim 9, comprising at least two distributed mode actuators attached to the panel and arranged to enhance the panel displacement at the touch location.

16. Apparatus according to claim 9, comprising a visual display device associated with the bending wave panel.

17. Apparatus according to claim 16, wherein at least a part of the panel is transparent and the visual display device is mounted behind the transparent part of the panel.

18. Apparatus according to claim 17, wherein the panel comprises an integral visual display device.

19. Apparatus according to claim 1, wherein the panel functions as a microphone.

* * * * *